United States Patent
Radsliff et al.

(10) Patent No.: US 9,923,769 B2
(45) Date of Patent: Mar. 20, 2018

(54) METHODS AND SYSTEMS FOR VERIFYING INSTALLATION OF A DEVICE

(71) Applicant: Candi Controls, Inc., Oakland, CA (US)

(72) Inventors: Peter Radsliff, San Mateo, CA (US); Mike Anderson, Moraga, CA (US); Steve Raschke, Oakland, CA (US)

(73) Assignee: Candi Controls, Inc., Oakland, CA (US)

( * ) Notice: Subject to any disclaimer, the term of this patent is extended or adjusted under 35 U.S.C. 154(b) by 277 days.

(21) Appl. No.: 14/820,294

(22) Filed: Aug. 6, 2015

(65) Prior Publication Data

US 2016/0142258 A1     May 19, 2016

Related U.S. Application Data

(60) Provisional application No. 62/081,973, filed on Nov. 19, 2014.

(51) Int. Cl.
*H04L 12/26* (2006.01)
*H04W 4/14* (2009.01)
*H04L 12/24* (2006.01)

(52) U.S. Cl.
CPC .......... *H04L 41/0866* (2013.01); *H04L 41/04* (2013.01); *H04L 43/50* (2013.01); *H04W 4/14* (2013.01)

(58) Field of Classification Search
None
See application file for complete search history.

(56) References Cited

U.S. PATENT DOCUMENTS

| | | | | | |
|---|---|---|---|---|---|
| 5,881,236 | A | * | 3/1999 | Dickey | G06F 8/61 709/220 |
| 5,940,074 | A | * | 8/1999 | Britt, Jr. | G06F 3/04892 348/E5.002 |
| 6,691,300 | B1 | * | 2/2004 | Alexander | G06F 8/65 717/110 |
| 7,308,718 | B1 | * | 12/2007 | Brookner | G06F 21/305 713/1 |
| 8,248,269 | B1 | * | 8/2012 | Boyd | H04Q 9/00 340/870.02 |
| 8,578,376 | B2 | * | 11/2013 | Natchadalingam | G06F 8/65 718/1 |
| 9,417,868 | B2 | * | 8/2016 | Gaikwad | G06F 8/71 |
| 2003/0037327 | A1 | * | 2/2003 | Cicciarelli | G06F 8/61 717/178 |
| 2005/0090941 | A1 | * | 4/2005 | Stefan | G07C 5/008 701/1 |

(Continued)

*Primary Examiner* — Ayaz Sheikh
*Assistant Examiner* — Tarell Hampton (57) ABSTRACT

Methods and systems for verifying installation of a networked device are disclosed. Short message service (SMS) messages are used to communicate between an in-field device and a central computer system after an installation of a network device. The in-field device request an installation verification process be executed by the central computer system. The central computer system first requests an installation number from the in-field device, and then contacts a gateway networked to the network device to perform an installation verification test. The results of the test are sent to the in-field device via SMS.

19 Claims, 8 Drawing Sheets

(56) References Cited

U.S. PATENT DOCUMENTS

| | | | | |
|---|---|---|---|---|
| 2008/0003980 A1* | 1/2008 | Voss | H04L 63/0853 | 455/411 |
| 2009/0119662 A1* | 5/2009 | Fangmeier | G06F 8/60 | 717/176 |
| 2010/0038440 A1* | 2/2010 | Ersavas | A01G 1/00 | 236/51 |
| 2010/0273521 A1* | 10/2010 | Vong | H04M 1/24 | 455/550.1 |
| 2010/0279681 A1* | 11/2010 | Ahmad | H04W 24/08 | 455/424 |
| 2011/0201364 A1* | 8/2011 | Capuozzo | H04W 24/10 | 455/466 |
| 2012/0118947 A1* | 5/2012 | Lyons | G07F 17/3241 | 235/375 |
| 2012/0254784 A1* | 10/2012 | Vander Griend | G06Q 50/00 | 715/771 |
| 2013/0125107 A1* | 5/2013 | Bandakka | G06F 8/665 | 717/171 |
| 2013/0197698 A1* | 8/2013 | Shah | F24F 11/0009 | 700/276 |
| 2014/0039685 A1* | 2/2014 | Blount | G05B 15/02 | 700/276 |
| 2014/0097239 A1* | 4/2014 | Bayliff | G06F 17/30 | 235/375 |
| 2014/0183254 A1* | 7/2014 | Htay | H04L 41/0869 | 235/375 |
| 2014/0288761 A1* | 9/2014 | Butler | G07C 5/0816 | 701/29.6 |
| 2014/0374475 A1* | 12/2014 | Kallfelz | H04Q 9/00 | 235/375 |
| 2015/0067136 A1* | 3/2015 | Chang | H04W 16/24 | 709/224 |
| 2015/0090049 A1* | 4/2015 | Kertesz | H01M 2/1022 | 73/861.18 |
| 2015/0094929 A1* | 4/2015 | Bell | G07C 5/0808 | 701/99 |
| 2015/0103685 A1* | 4/2015 | Butchko | H04L 43/50 | 370/252 |
| 2015/0161621 A1* | 6/2015 | Becker | G06Q 30/0185 | 705/318 |
| 2015/0195718 A1* | 7/2015 | Jain | H04W 4/005 | 370/328 |
| 2015/0230760 A1* | 8/2015 | Schneider | G06F 19/3468 | 600/300 |
| 2016/0065653 A1* | 3/2016 | Chen | H04L 67/10 | 715/735 |
| 2016/0082988 A1* | 3/2016 | Kurz | B61L 15/0072 | 701/19 |

* cited by examiner

METHODS AND SYSTEMS FOR VERIFYING INSTALLATION OF A DEVICE

RELATED APPLICATION

This application claims priority to and benefit of the provisional U.S. Patent Application No. 62/081,973 filed on Nov. 19, 2014 entitled "Methods and systems for verifying installation of a device" by Peter Radsliff, Mike Anderson, and Steve Raschke, and assigned to the assignee of the present application.

BACKGROUND

Many modern hardware devices require some type of installation. The installation may be located in a home, a retail environment, an office setting, a commercial setting, etc. The installation may be performed by an installer or technician or may be done by a non-professional such as a home owner. The installation may be complex or simple and require multiple steps. The hardware device may be a standalone device or may be in communication with other devices.

BRIEF DESCRIPTION OF THE DRAWINGS

The drawings referred to in this description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Unless specifically stated otherwise as apparent from the following discussions, it is appreciated that throughout the present description of embodiments, discussions utilizing terms such as "receiving", "sending", "contacting", "requesting", "verifying", "authenticating", or the like, often refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

The discussion below begins with a glossary of terms and then follows with an overview of systems and methods for verifying installation of a networked device. The discussion then turns to a description of embodiments for verifying installation of a networked device and finally a discussion of operations for verifying installation of a networked device.

Glossary of Terms

The following is a list of definitions for terminology used herein.

A "subscriber" is an end user of the web services of the cloud-assisted network-device integration (CANDI) system. The subscriber usually wants to control, monitor and gather data from devices in a home or commercial building.

A "domain" is the integrated sum of devices and software applications that interoperate to provide control, feedback and monitoring within a home or commercial building under a single subscriber login.

A "premises" is a location at which a domain (defined above) resides. The premises may be a house or other residential setting or may be a commercial or retail setting. A premises may also refer to a site or job site.

A "product" is an off-the-shelf component as delivered to the market by its manufacturer. The product is not necessarily capable of interfacing within the CANDI system.

A "device" or "networked device" is a product that the CANDI system is able to monitor and control through being characterized (defined below) and implemented within a domain of the CANDI system.

"Characterized" refers to a product being defined to be within a specific device class able to perform specific actions. Products are classified by type or types (e.g. "TV", "Light Dimmer"). The CANDI system addressable products are further uniquely identified by their particular make (manufacturer) and model number. Additionally, every CANDI system addressable product is identified by having one or more "communication port" (defined below).

A "communication port" refers to the following: 1) a physical communication method (e.g. infrared, Z-Wave, ZigBee, serial, IP, X-10, INSTEON, RF); and 2) a protocol running over that port. Depending on the physical communication method, a port may also have field-determined information (e.g. address, login information) used for operation.

An "action" refers to at least one of the following: a service; a network; and a default attribute of a set of attributes, wherein the set of attributes includes but is not limited to codes and parameters. An action may be static.

A "device driver" is located at the premises and associates the following three product characteristics of a device: 1)

one or more protocols for that device; 2) an implementer that implements an action; and 3) a specific list of actions possible to be implemented through the device, using the protocol(s). A protocol may handle more actions (e.g. commands) than are actually supported by the implementer. Thus, the device driver supports actions specific to the implementer. Over time and with new versions of implementers, more actions may become available to be implemented. Actions are assigned and configured for a particular device driver.

A "gateway" refers to a hardware device that is located on the premises and is connected to a network such as the Internet. The gateway is connected physically or wirelessly to the networked devices on the premises and is used to manage or otherwise control the networked devices.

Overview of Verifying Installation of a Networked Device

Embodiments described herein are for verifying installation of a networked device. A premises such as a residential setting may have many devices installed within the premises. The devices may be networked or referred to as networked devices. The networked devices may be a variety of devices including, but not limited to a router, a modem, a security system, a heater, a camera, a piece of network equipment, a lighting control, an appliance, a thermostat, a door lock, an alarm, a fire suppressant system, and/or a building control system. Some or all of the networked devices may be controlled or otherwise managed by a gateway. For example, the gateway may be place between the networked devices and their access to the Internet or other network. The networked devices may communicate with the gateway using wireless or wired connections such as Ethernet, Wifi, Bluetooth, near-field communications, etc. The networked devices may also be in communication with one another. The gateway may also be able to manage or control the networked devices by issuing commands to perform operations such as power on or off, adjust settings, perform diagnostic tests, etc.

In one embodiment, the networked devices must be installed in the premises by an installer. The installer may be the resident or may be a professional installer. The installation process may be simple or complex. In one embodiment, there is a physical installation performed by a builder of the premises but the connection of the networked device is done later by a secondary installer or the occupant of the premises. Once the installation is complete the installer may desire to have confirmation or verification whether the networked device was properly installed. Such verification may be used for the installer's records and may be used for billing purposes. Prior solutions required an installer to use specialized software designed for the purpose of verifying or managing an installation. The specialized software may require the installer to receive training on how to use the specialized software and may have required the installer to carry a laptop or other computer system with them in the field to download, install, and execute the software. The specialized software may also have required authentication procedures before an installer could use the specialized software. These requirements of such specialized software are time consuming and lead to situations where an in-field installer may not be able to use the specialized software while in the field.

The present technology employs a ubiquitous interface and communication method that requires little or no special training or authentication process for the installer to perform prior to use. In one embodiment, the present technology employs short message service (SMS) messages to perform methods for verifying installation of a networked device. SMS messages may also be referred to as text messages or text messaging. The SMS messages may be sent via a cellular phone, a smart phone, tablet computer, iOS device, Android device, or other device capable of communicating with SMS messages. In one embodiment, the SMS may be sent via 3G, 4G, Wifi, or any other type of network connection. By employing SMS messages, the present technology allows an installer to use a cell phone or other device in-field that the installer is likely already carrying with them. Moreover, in one embodiment, the present technology does not employ a special interface for the SMS messages and instead uses the interface already installed on the cell phone or other device. Thus the installer may use the present technology for verifying installation of a networked device without any special software, training, or authentication procedures.

In one embodiment, the cell phone, smart phone or other device capable of sending and receiving SMS messages is referred to herein as an in-field device. In one embodiment, the in-field device is mobile and handheld. After an installer has performed an installation of a networked device, the installer may use the in-field device to send an SMS message to a central computer system to request or command the start of the process for verifying installation of the networked device. The initial SMS message may be required to contain a specific phrase to start the verification process. An example of the specific phrase may be "start test". The central computer system may or may not recognize the phone number of the in-field device sending the initial SMS message. In one embodiment, the central computer system will only respond to SMS message received from known in-field devices. In such an embodiment, the phone number of the in-field device is similar to an authentication login only the installer or user of the in-field device is not required to enter any authentication data into the in-field device. The SMS message may be sent over a cell phone tower to the central computer system.

The central computer system may then respond via an SMS message requesting an installation number such as an installation kit number. In one embodiment, the installation kit number is given to the installer with the materials that came with the networked device to be installed. In one embodiment, the installation kit number is associated with the local gateway and may be physically printed on the gateway. In one embodiment, the installation kit number is the MAC address associated with the gateway. The installation kit number allows the central computer system to identify any gateway anywhere in the world. The central computer system may or may not know the location of the gateway.

In one embodiment, after the central computer system has received the installation kit number, the central computer system may contact the gateway over a network connection such as the Internet and command the gateway to perform an installation verification test for all devices associated with the gateway. In one embodiment, the central computer system will send another SMS message to the in-field device requesting a token identification number before the installation verification test is performed.

The token identification number may be a number that refers to customer identification but is obfuscated. The customer identification may be a physical location of the premises or may be a specific identification referring to the new networked device being installed. The token identification number may be given to the installer with the materials that came with the networked device to be installed. In one embodiment, once the central computer system receives an SMS message from the in-field device, the central computer system commands the gateway to perform an installation verification test. It should be appreciated that the present technology does not require a token identification number or steps that involve a token identification number. Embodiments may or may not employ the token identification number.

The installation verification test is a test for verifying installation of a networked device. The test results may be comprehensive and sent to the central computer system. The results may include error codes or other data. The central computer system may send all such information to the in-field device via SMS message or may only send a pass/fail message regarding the success of the installation. In one embodiment, if the installation is verified as a success, then the central computer system will send an SMS message to the in-field device verifying the success as well as an identification number pertaining to the test results. This identification number may be recorded by the installer in paper work or entered into a software program by the installer for record keeping purposes. The identification number may be used to signal that an installation is complete and successful and that a customer may be billed or invoiced for the installer's services associated with the installation.

Another reason for the verification code is that it allows the installer to bill the company that contracted with them for the installation because it proves that their work was finished along with date, and time. In another embodiment, the installers would be asked to "Start HQ" when they arrived at the premises and then when the job is finished and verified, we also can provide the duration of the installation effectively using this system to work as a time clock to log the installer's hours.

An attribute of the present technology is that it can function as a mobile workforce management tool (i.e. hours, efficiency, billing, etc.), not only as a technology verification tool (i.e. ease of testing and verification, verify codes, etc.).

In one embodiment, if the installation is verified as having failed, the central computer system may send an SMS message notifying the in-field device of the failure. In one embodiment, SMS message also contains a phone number for the installer to call for technical support. In one embodiment, the SMS message also contains an error code generated by the gateway pertaining to the failure to install. In one embodiment, the SMS message also contains complete results of the failure as generated by the gateway.

It should be appreciated that the present technology may employ the in-field device using SMS messages in conjunction with the central computer system and the gateway to control the networked devices in other ways. For example, SMS messages may be used to turn lights on or off or perform any other function that the gateway is capable of controlling and managing for the networked devices. The SMS messages may comprise codes or key phrases that control the networked devices. The phone number associated with the in-field device may be recognized by the central computer system and associated with a particular gateway or the central computer system may require the in-field device to enter some type of identification such as the installation kit number for the central computer system to authorize the in-field device for a particular gateway.

Embodiments of Verifying Installation of a Networked Device

Figure 1A:
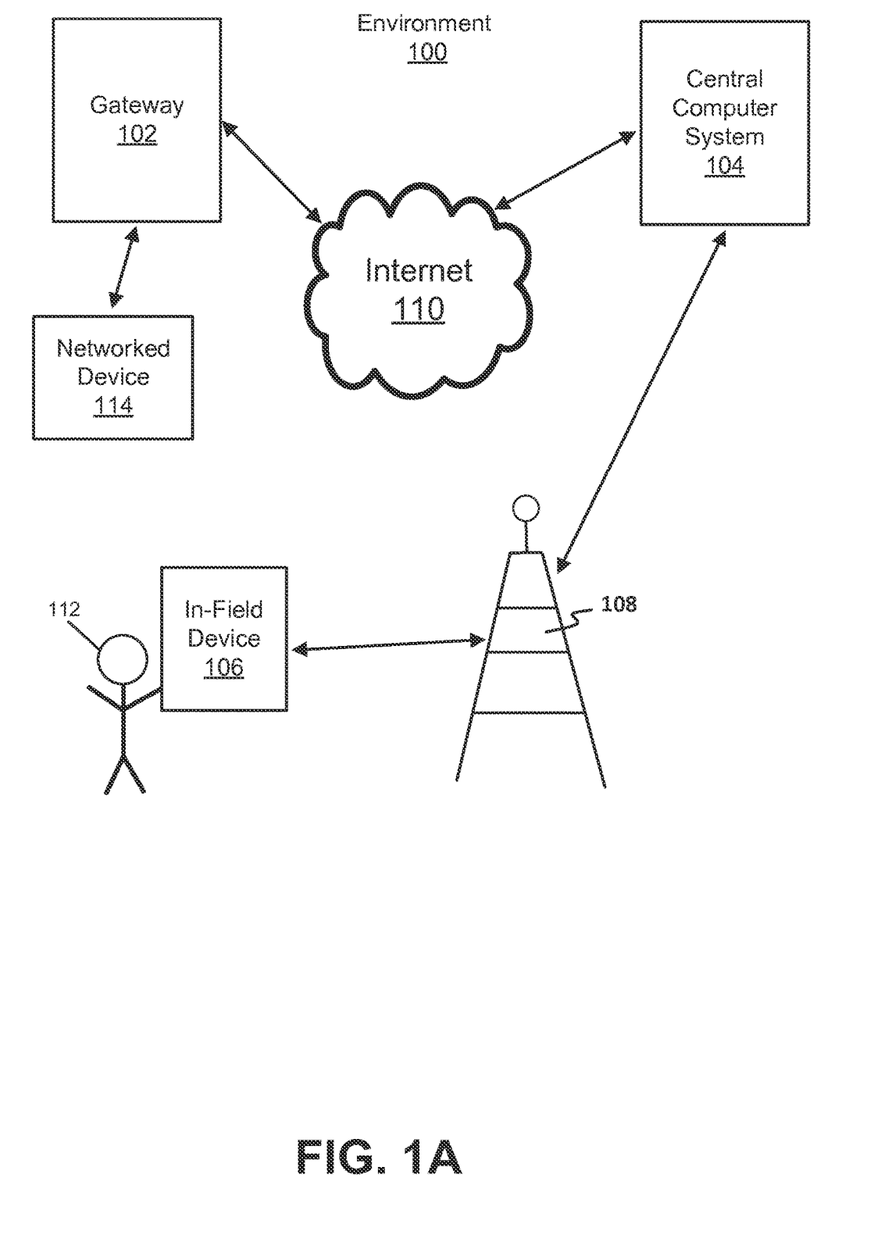
FIG. 1A is a block diagram of an environment for verifying installation of a networked device, in accordance with an embodiment.

With reference now to FIG. 1A, a block diagram of environment 100 for verifying installation of a networked device, according to various embodiments. In one embodiment, gateway 102 is a hardware device designed to control and manage all devices connected to gateway 102 such as networked device 114. Gateway 102 may act as a firewall or gatekeeper for all network traffic outside of the premises meaning all communications sent to the Internet 110. Gateway 102 may be able to control networked device 114 by turning networked device 114 on or off and performing other functions such as adjusting settings or gathering usage data. For example, if networked device 114 was a thermostat, then gateway 102 could change the temperature setting of the thermostat or program it to turn on and off or adjust settings at scheduled times. Gateway 102 can also perform diagnostics tests on networked device 114 to ensure that networked device 114 is running properly including an installation verification test to ensure that networked device 114 is properly installed. Gateway 102 may be able to manage a plurality of networked devices. Gateway 102 may be an off the shelf device or a specific purpose device. Gateway 102 may also be a combination device and combine services. For example, gateway 102 may also be a modem and/or router or wireless router.

Networked device 114 may be a variety of devices including, but not limited to a router, a modem, a security system, a heater, a camera, a piece of network equipment, a lighting control, an appliance, a thermostat, a door lock, an alarm, a fire suppressant system, and/or a building control system. Networked device 114 may be able to communicate with other networked devices on the premises such as a fire suppressant system communicating with an alarm or security system.

Central computer system 104 may be a server computer system or a plurality of computer systems. Central computer system 104 may also be components split up and located in various places. For example, central computer system 104 may employ cloud computing techniques. Central computer system 104 is able to communicate over internet 110 as well as over other broadband networks. In one embodiment, central computer system 104 is able to receive and send communications to cell tower 108 including SMS messages. Central computer system 104 contacts and commands gateway 102 over internet 110.

In-field device 106 is a cell phone, smart phone, or other device capable of sending SMS messages. In one embodiment, in-field device 106 is a mobile handheld device that has an off the shelf interface for sending and receiving SMS messages. In-field device 106 may be personally owned by installer 112 or may be owned by a company associated with installer 112. Installer 112 may be a home owner or a professional installer of networked device 114. Installer 112 may or may not have specific training for installing networked device 114.

In one embodiment, the in-field device is a dedicated device built for the purposes of carrying out the present technology. As such a dedicated device may provide a measure of security in that the device may not be used for any other purposes or only for other purposes authorized by the owner of the dedicated device. In one embodiment, the in-field device employs a dedicated App that sends and receives SMS messages. The dedicated App may be pre-registered and password protected with an interface that is not an off the shelf interface. The App may be easily downloaded and installed on the in-field device with an interface that is user friendly and requires little or no special training or skills to operate.

Figure 1B:
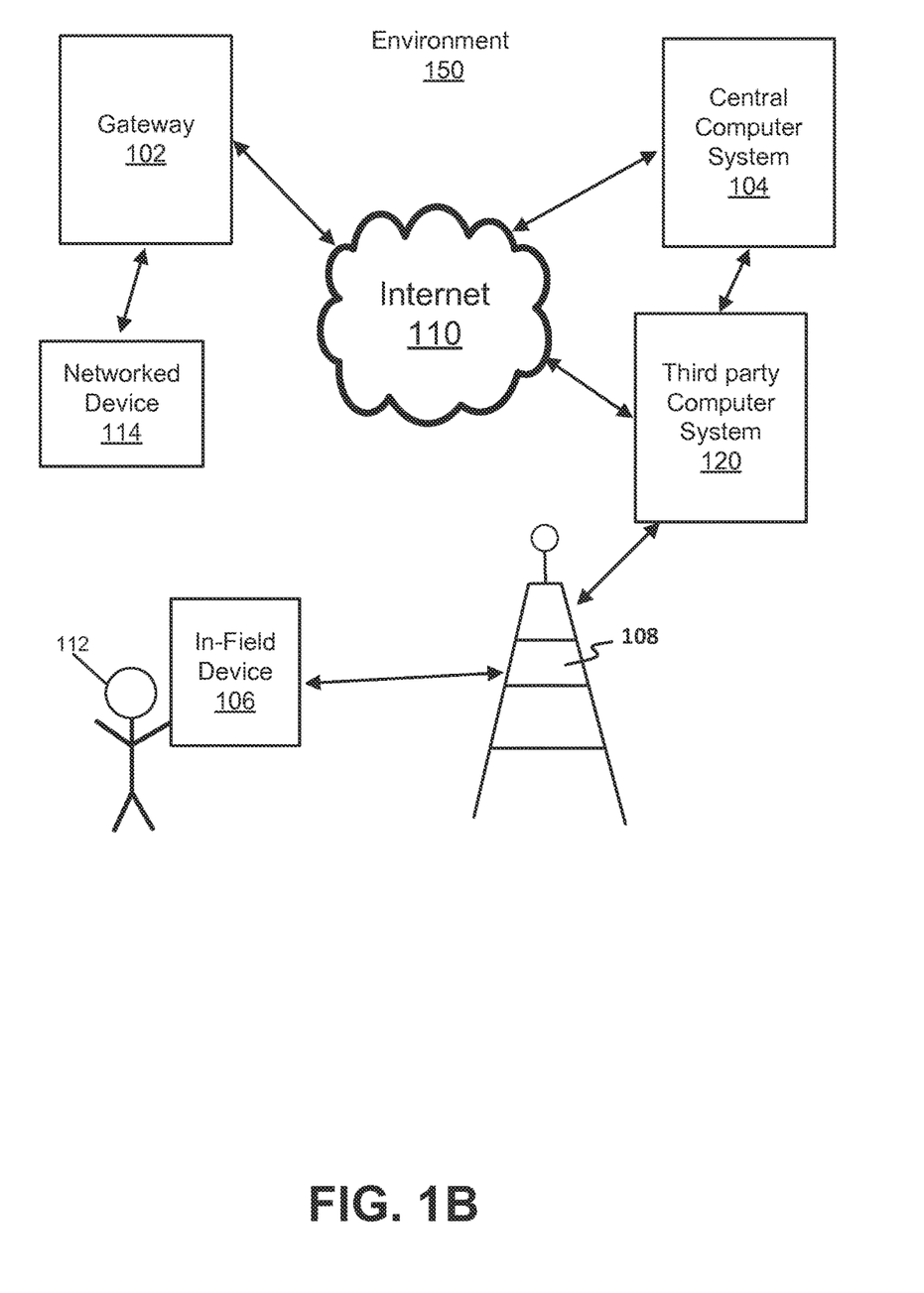
FIG. 1B is a block diagram of an environment for verifying installation of a networked device, in accordance with an embodiment.

With reference now to FIG. 1B, a block diagram of environment 150 for verifying installation of a networked device, according to various embodiments. FIG. 1B has all the same devices, components and parts or FIG. 1A with the same features and capabilities with the addition of third party computer system 120. In one embodiment, third party computer system 120 is a third party service that has SMS message capabilities. In one embodiment, central computer system 104 may not have SMS message capabilities and instead relies upon third party computer system 120 for such capabilities. For example, central computer system 104 may communicate directly with third party computer system 120 or may communicate through internet 110. In operation, all SMS messages from in-field device 106 sent to central computer system 104 would actually be sent to third party computer system 120 and are then forwarded or relayed to central computer system 104. Messages from central computer system 104 intended for in-field device 106 are sent to third party computer system 120 and are then forwarded or relayed to in-field device 106 as SMS messages.

Figure 2:
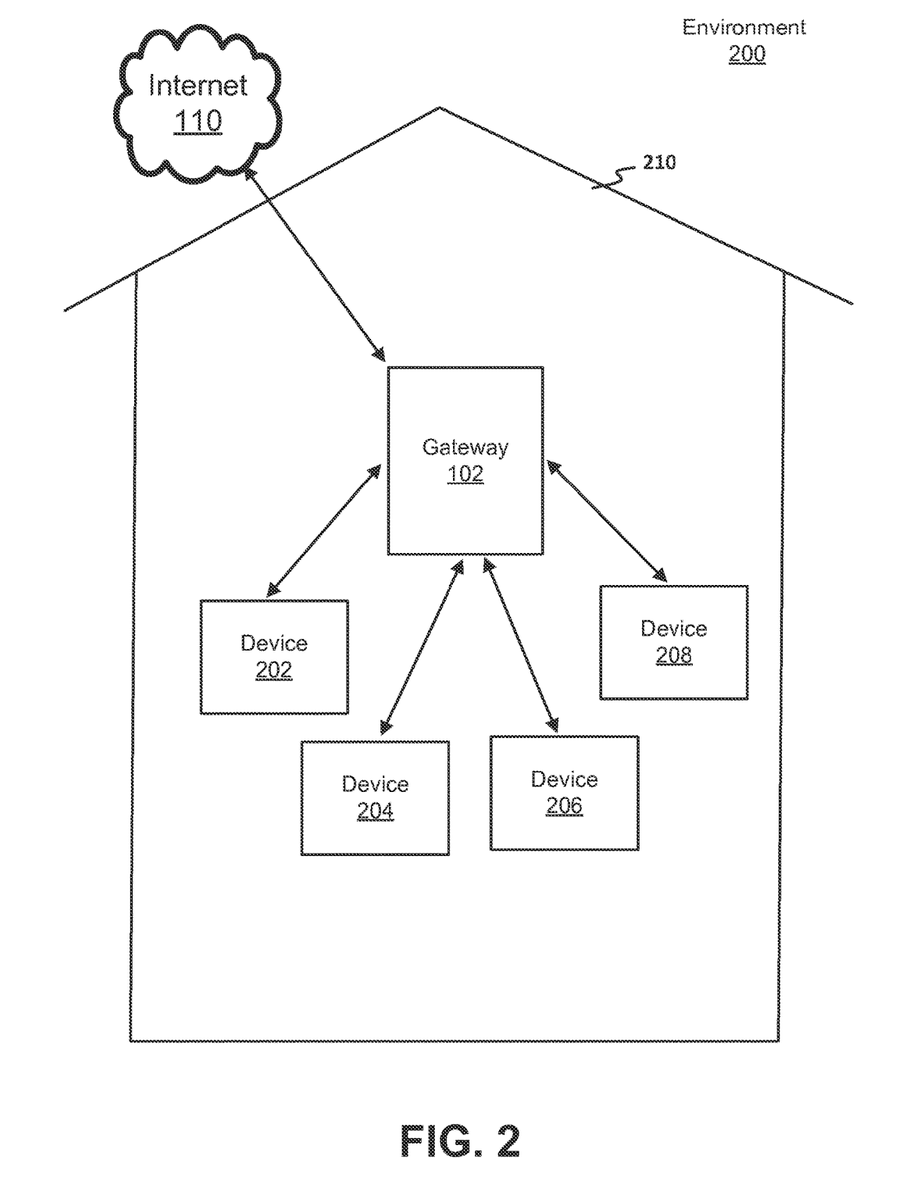
FIG. 2 is a block diagram of an environment for verifying installation of a networked device, in accordance with an embodiment.

With reference now to FIG. 2, a block diagram of environment 200 for verifying installation of a networked device, according to various embodiments. Premises 210 may be a house or other residential setting or a building for a commercial, retail, or office setting. Gateway 102 is the same as gateway 102 in FIG. 1A. Environment 200 depicts gateway 102 with devices 202, 204, 206, and 208 all installed at premises 210. Devices 202, 204, 206, and 208 may be a variety of devices including, but not limited to a router, a modem, a security system, a heater, a camera, a piece of network equipment, a lighting control, an appliance, a thermostat, a door lock, an alarm, a fire suppressant system, and/or a building control system.

Figure 3:
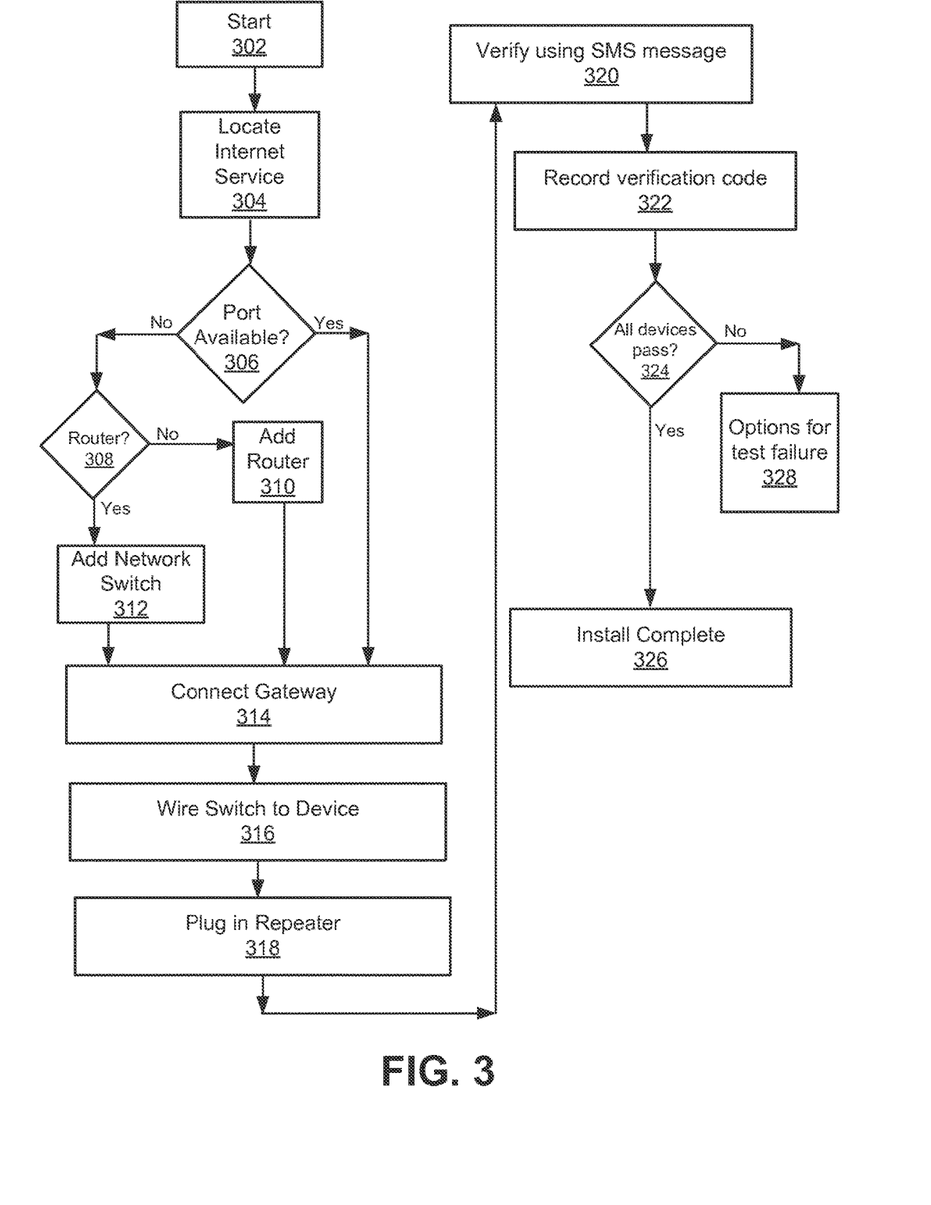
FIG. 3 is a workflow diagram for verifying installation of a networked device, in accordance with an embodiment.

With reference now to FIG. 3, a workflow for verifying installation of a networked device. The left side of the workflow shows the procedure for an installer to physically install a device such as networked device 114 of FIG. 1A in a premises and connecting the device to a gateway. Step 302 is the start of the work flow. At step 304 the installer locates the internet service at the premises. In one embodiment, the internet service refers to the physical hardware located on the premises that is employed to provide internet connectivity for devices at the premises such as a modem or router. At step 306 the installer determines whether a network port associated with the internet services is available. If yes, then the installer proceeds to step 314. If not, then at step 308 the install determiners if the internet services on the premises include a router. If there is not a router, then at step 310 the installer adds a router such as a physical network router to the premises connected to the internet services and proceeds to step 314. If there is a router, then at step 312 the installer adds a network switch to the router to add ports to the internet services on the premises, then the installer proceeds to step 314.

At step 314 the installer connects a gateway to the available port such that the gateway is connected to the internet services on the premises. In one embodiment, the gateway is gateway 102 of FIG. 1A. At step, 316 the installer wires a switch, such as a remote coax switch (RCS), to the device that is to be installed. At step 318 the installer plugs in a repeater between the gateway and the switch.

The right side of the workflow shows embodiments of the present technology. At step 320 the installer verifies that the device was properly connected using the present technology. For example, the installer uses an in-field device to communicate with a central computer system via SMS to have the gateway perform an installation verification test. At step 322, if the installation is verified successfully, the installer reads a verification code from the interface of the in-field device and records the verification code for his records.

At step 324 the installer determines whether or not all devices that were installed have successfully been verified using the methods of the present technology. If yes, then the installation is complete at step 326. If no, then the installer is given options regarding the test failure at step 328 via the interface of the in-field device. For example, the installer can request a second verification test, error codes can be sent, or the installer can call for support.

Operations

Figure 4:
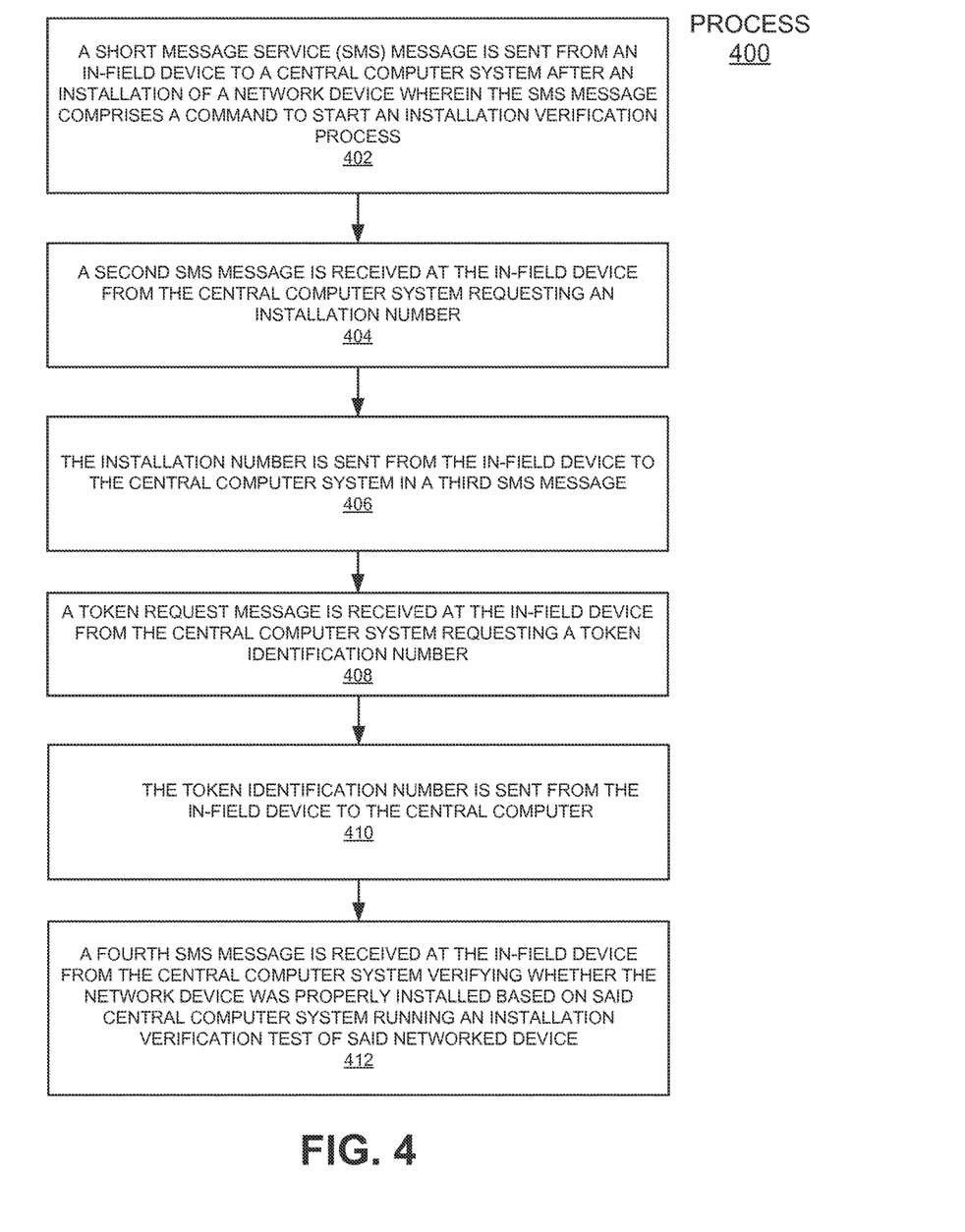
FIG. 4 is a flowchart for verifying installation of a networked device, in accordance with an embodiment.

With reference to FIG. 4, process 400 is a process for verifying installation of a networked device. In one embodiment, process 400 is computer implemented methods that are carried out by processors and electrical components under the control of computer-usable and computer executable instructions. The computer-usable and computer executable instructions reside, for example, in data storage features such as computer-usable volatile and non-volatile memory. However, the computer-usable and computer executable instructions may reside in any type of non-transitory computer-usable storage medium that can be read by a computer. In one embodiment, process 400 is performed by the components of FIG. 1A, 1B, 2, or 3. In one embodiment, the methods may reside in a computer-usable storage medium having instructions embodied therein that when executed cause a computer system to perform the method.

At 402, a short message service (SMS) message is sent from an in-field device to a central computer system after an installation of a network device wherein the SMS message comprises a command to start an installation verification process. The in-field device may be a mobile device that communicates over a cellular network or other wireless network. The network device may be, but is not limited to, a router, a modem, a security system, a heater, a camera, a network equipment, a lighting control, an appliance, a thermostat, a door lock, or a building control system. In one embodiment, the central computer system is not capable of handling SMS messages, in which case a third party computer system or service is relied upon to receive SMS messages from the in-field device and forward them to the central computer system in a different format. Messages from the central computer system are then forwarded from the third party computer system to the in-field device in the SMS message format.

At 404, a second SMS message is received at the in-field device from the central computer system requesting an installation number.

At 406, the installation number is sent from the in-field device to the central computer system in a third SMS message.

At 408, a token request message is received at the in-field device from the central computer system requesting a token identification number.

At 410, the token identification number is sent from the in-field device to the central computer system.

At 412, a fourth SMS message is received at the in-field device from the central computer system verifying whether the network device was properly installed based on said central computer system running an installation verification test of said networked device. In one embodiment, the fourth SMS message has a verification code indicating that the network device was properly installed. In one embodiment, the fourth SMS message has a phone number to call for further support. In one embodiment, the fourth SMS message indicates that said network device was not properly installed and said fourth SMS message further comprises an option to perform a second installation verification test. The verification test may be performed by a gateway in response to a command from the central computer system where the gateway remote to the central computer system but is in physical proximity to the network device and can control or otherwise communicate with the network device.

Figure 5:
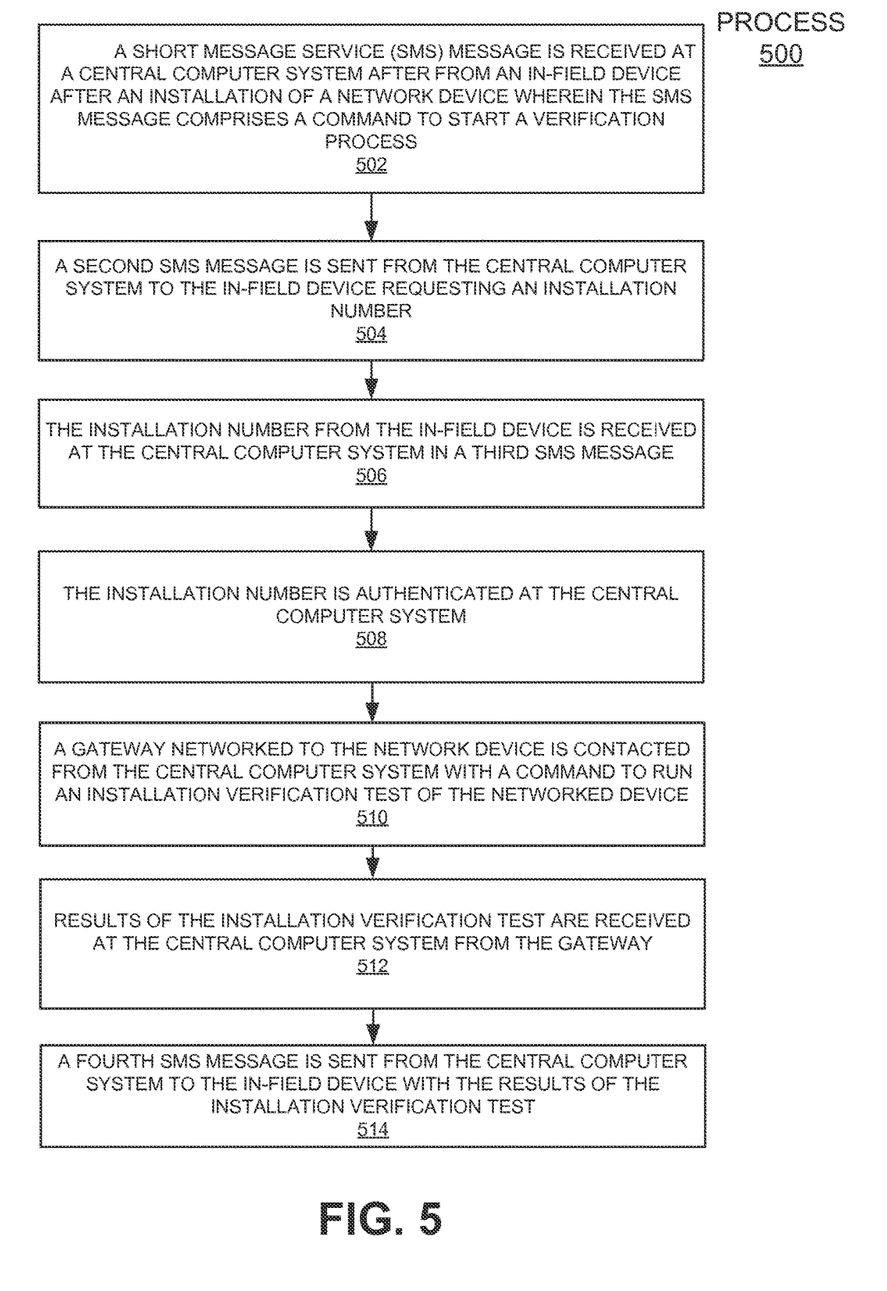
FIG. 5 is a flowchart for verifying installation of a networked device, in accordance with an embodiment.

With reference to FIG. 5, process 500 is a process for verifying installation of a networked device. In one embodiment, process 500 is computer implemented methods that are carried out by processors and electrical components under the control of computer-usable and computer executable instructions. The computer-usable and computer executable instructions reside, for example, in data storage features such as computer-usable volatile and non-volatile memory. However, the computer-usable and computer executable instructions may reside in any type of non-transitory computer-usable storage medium that can be read by a computer. In one embodiment, process 500 is performed by the components of FIG. 1A, 1B, 2, or 3. In one embodiment, the methods may reside in a computer-usable storage medium having instructions embodied therein that when executed cause a computer system to perform the method.

At 502, a short message service (SMS) message is received at a central computer system after from an in-field device after an installation of a network device wherein the SMS message comprises a command to start a verification process.

At 504, a second SMS message is sent from the central computer system to the in-field device requesting an installation number.

At 506, the installation number from the in-field device is received at the central computer system in a third SMS message.

At 508, the installation number is authenticated at the central computer system.

At 510, a gateway networked to the network device is contacted from the central computer system with a command to run an installation verification test of the networked device.

At 512, results of the installation verification test are received at the central computer system from the gateway.

At 514, a fourth SMS message is sent from the central computer system to the in-field device with the results of the installation verification test. In one embodiment, upon verification that the network device was installed properly, a bill may be sent to a customer for performing the installation of the networked device. The verification can be used in a record to demonstrate to the customer that the installation was verified and thus the bill is justified. In one embodiment, if the installation test indicates that the installation was successful, then the fourth SMS message comprises a verification code.

Figure 6:
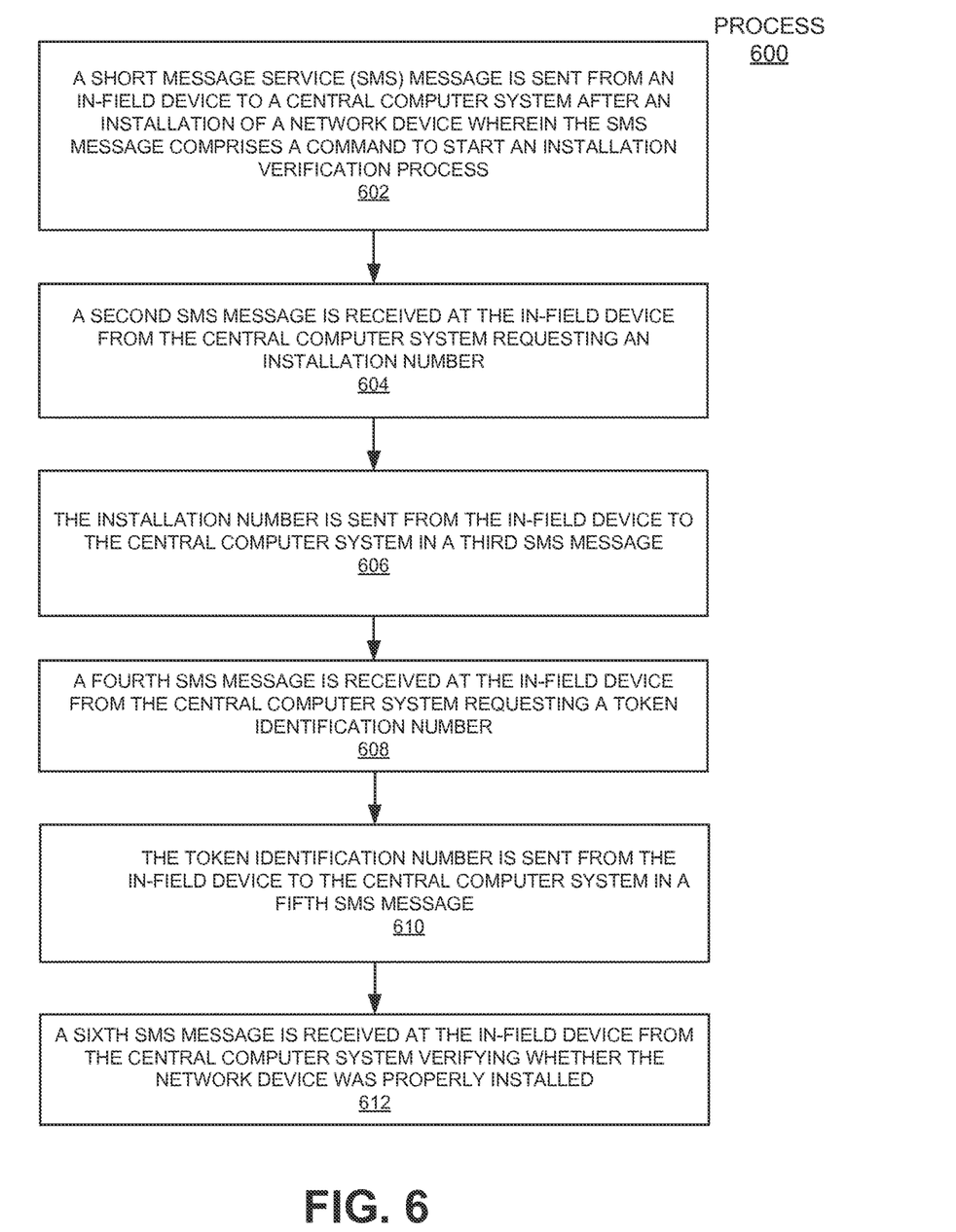
FIG. 6 is a flowchart for verifying installation of a networked device, in accordance with an embodiment.

With reference to FIG. 6, process 600 is a process for verifying installation of a networked device. In one embodiment, process 600 is computer implemented methods that are carried out by processors and electrical components under the control of computer-usable and computer executable instructions. The computer-usable and computer executable instructions reside, for example, in data storage features such as computer-usable volatile and non-volatile memory. However, the computer-usable and computer executable instructions may reside in any type of non-transitory computer-usable storage medium that can be read by a computer. In one embodiment, process 600 is performed by the components of FIG. 1A, 1B, 2, or 3. In one embodiment, the methods may reside in a computer-usable storage medium having instructions embodied therein that when executed cause a computer system to perform the method.

At 602, a short message service (SMS) message is sent from an in-field device to a central computer system after an installation of a network device wherein the SMS message comprises a command to start an installation verification process.

At 604, a second SMS message is received at the in-field device from the central computer system requesting an installation number.

At 606, the installation number is sent from the in-field device to the central computer system in a third SMS message.

At 608, a fourth SMS message is received at the in-field device from the central computer system requesting a token identification number.

At 610, the token identification number is sent from the in-field device to the central computer system in a fifth SMS message.

At 612, a sixth SMS message is received at the in-field device from the central computer system verifying whether the network device was properly installed.

Computer System

Figure 7:
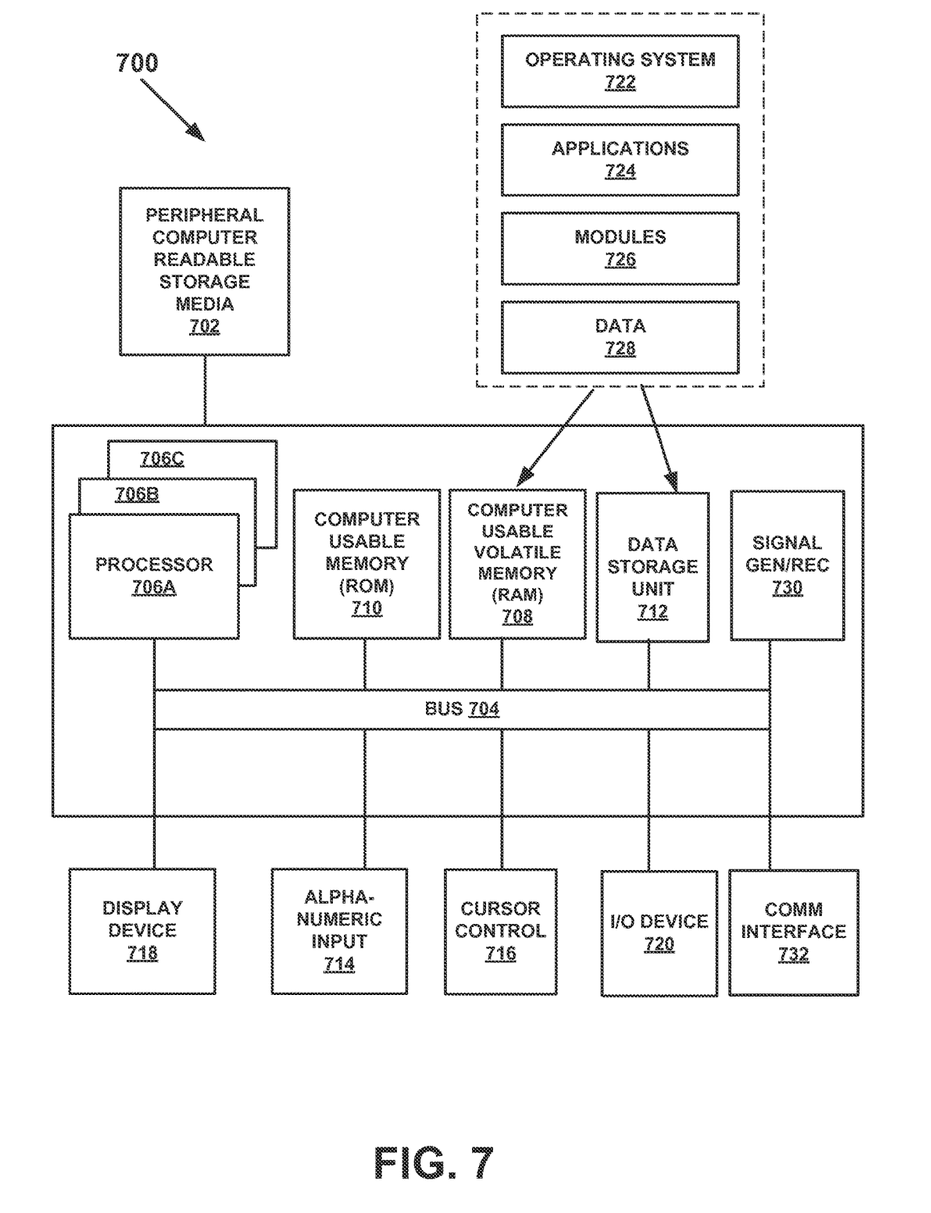
FIG. 7 is a block diagram of an example computer system upon which embodiments of the present technology may be implemented.

With reference now to FIG. 7, portions of the technology for providing a communication composed of computer-readable and computer-executable instructions that reside, for example, in non-transitory computer-usable storage media of a computer system. That is, FIG. 7 illustrates one example of a type of computer that can be used to implement embodiments of the present technology. FIG. 7 represents a system or components that may be used in conjunction with aspects of the present technology. In one embodiment, some or all of the components of FIG. 1A, 1B, 2, or 3 may be combined with some or all of the components of FIG. 7 to practice the present technology.

FIG. 7 illustrates an example computer system 700 used in accordance with embodiments of the present technology. It is appreciated that computer system 700 of FIG. 7 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 7, computer system 700 of FIG. 7 is well adapted to having peripheral computer readable media 702 such as, for example, a floppy disk, a compact disc, and the like coupled thereto.

Computer system 700 of FIG. 7 includes an address/data bus 704 for communicating information, and a processor 706A coupled to bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer-usable volatile memory 708, e.g. random access memory (RAM), coupled to bus 704 for storing information and instructions for processors 706A, 706B, and 706C.

Computer system 700 also includes computer-usable non-volatile memory 710, e.g. read only memory (ROM), coupled to bus 704 for storing static information and instructions for processors 706A, 706B, and 706C. Also present in computer system 700 is a data storage unit 712 (e.g., a magnetic or optical disk and disk drive) coupled to bus 704 for storing information and instructions. Computer system 700 also includes an optional alpha-numeric input device 714 including alphanumeric and function keys coupled to bus 704 for communicating information and command selections to processor 706A or processors 706A, 706B, and 706C. Computer system 700 also includes an optional cursor control device 716 coupled to bus 704 for communicating user input information and command selections to processor 706A or processors 706A, 706B, and 706C. Computer system 700 of the present embodiment also includes an optional display device 718 coupled to bus 704 for displaying information.

Referring still to FIG. 7, optional display device 718 of FIG. 7 may be a liquid crystal device, cathode ray tube, plasma display device, light emitting diode (LED) light-bar, or other display device suitable for creating graphic images and alpha-numeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet. A more detailed discussion of the present technology is found below.

Referring still to FIG. 7, various other components are depicted for computer system 700. Specifically, when present, an operating system 722, applications 724, modules 726, and data 728 are shown as typically residing in one or some combination of computer-usable volatile memory 708, e.g. random access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one or more communication interface(s) 732 for coupling information to and/or from computer system 700. Communication interface 732 may include a serial port, parallel port, Universal Serial Bus (USB), Ethernet port, antenna, or other input/output interface. Communication interface 732 may physically, electrically, optically, or wirelessly (e.g. via radio frequency) couple computer system 700 with another device, such as a cellular telephone, radio, or computer system.

The computer system 700 is only one example of a suitable computing environment and is not intended to suggest any limitation as to the scope of use or functionality of the present technology. Neither should the computing environment be interpreted as having any dependency or requirement relating to any one or combination of components illustrated in the example computer system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What we claim is:

1. A non-transitory computer readable storage medium having instructions embodied therein that when executed cause a computer system to perform a method for verifying installation of a networked device, said method comprising:
sending a short message service (SMS) message from an in-field device to a central computer system after an installation of a network device wherein said SMS message comprises a command to start an installation verification process;
receiving a second SMS message at said in-field device from said central computer system requesting an installation number;
sending said installation number from said in-field device to said central computer system in a third SMS message; and
receiving a fourth SMS message at said in-field device from said central computer system verifying whether said network device was properly installed based on said central computer system running an installation verification test of said networked device, wherein said verifying is accomplished via said central computer system contacting a gateway networked to said network device, wherein said gateway performs an installation verification test.

2. The non-transitory computer readable storage medium as recited in claim 1 wherein said fourth SMS message further comprises a verification code number verifying that said network device was properly installed.

3. The non-transitory computer readable storage medium as recited in claim 1 wherein said network device was not properly installed and said fourth SMS message further comprises a phone number to call for further support.

4. The non-transitory computer readable storage medium as recited in claim 1 wherein said network device was not properly installed and said fourth SMS message further comprises an error code indicating a type of error in said installation.

5. The non-transitory computer readable storage medium as recited in claim 1 wherein said installation verification test indicates that said network device was not properly installed and said fourth SMS message further comprises an option to perform a second installation verification test.

6. The non-transitory computer readable storage medium as recited in claim 1 wherein said in-field device is a mobile handheld cellular phone and said in-field device communicates with said central computer system over a cellular network.

7. The non-transitory computer readable storage medium as recited in claim 1 wherein said network device is selected from the group of network devices consisting of: a router, a modem, a security system, a heater, a camera, a network equipment, a lighting control, an appliance, a thermostat, a door lock, and a building control system.

8. The non-transitory computer readable storage medium as recited in claim 1 wherein said gateway communicates with said central computer system over an Internet connection.

9. The non-transitory computer readable storage medium as recited in claim 1, further comprising:
before said receiving said fourth SMS message, receiving a token request message at said in-field device from said central computer system requesting a token identification number; and
sending said token identification number from said in-field device to said central computer system.

10. The non-transitory computer readable storage medium as recited in claim 1 wherein all SMS messages between said in-field device and said central computer system are relayed through a third party computer system.

11. A non-transitory computer readable storage medium having instructions embodied therein that when executed cause a computer system to perform a method for verifying installation of a networked device, said method comprising:
receiving a short message service (SMS) message at a central computer system after from an in-field device after an installation of a network device wherein said SMS message comprises a command to start a verification process;
sending a second SMS message from said central computer system to said in-field device requesting an installation number;
receiving said installation number from said in-field device at said central computer system in a third SMS message;
authenticating said installation number at said central computer system; contacting a gateway networked to said network device from said central computer system with a command to run an installation verification test of said networked device;
receiving results of said installation verification test at said central computer system from said gateway; and
sending a fourth SMS message from said central computer system to said in-field device with said results of said installation verification test.

12. The non-transitory computer readable storage medium as recited in claim 11, further comprising:
upon verification that said network device was installed properly, sending a bill to a customer for performing said installation of said networked device.

13. The non-transitory computer readable storage medium as recited in claim 11, further comprising:
before said contacting said gateway, sending a token request message from said central computer system to said in-field device requesting a token identification number; and
receiving said token identification number from said in-field device at said central computer system.

14. The non-transitory computer readable storage medium as recited in claim 11 where said fourth SMS message further comprises a verification code number verifying that said network device was installed properly.

15. The non-transitory computer readable storage medium as recited in claim 11 wherein said in-field device is a mobile handheld cellular phone and said in-field device communicates with said central computer system over a cellular network.

16. The non-transitory computer readable storage medium as recited in claim 11 wherein said network device is selected from the group of network devices consisting of: a router, a modem, a security system, a heater, a camera, a network equipment, a lighting control, an appliance, a thermostat, a door lock, and a building control system.

17. The non-transitory computer readable storage medium as recited in claim 11 wherein all SMS messages between said in-field device and said central computer system are relayed through a third party computer system.

18. A system for verifying installation of a networked device, said system comprising:
an in-field device associated with an installer capable of sending and receiving short message service (SMS) messages;
a central computer system capable of sending and receiving short message service (SMS) messages;
a gateway networked to a networked device wherein said gateway is capable of performing an installation verification test of said networked device to verify whether said network device has been properly installed by said installer;
said in-field device and said central computer system are further for:
sending a short message service (SMS) message from said in-field device to said central computer system after an installation of a network device wherein said SMS message comprises a command to start an installation verification process;
receiving a second SMS message at said in-field device from said central computer system requesting an installation number;
sending said installation number from said in-field device to said central computer system in a third SMS message; and
receiving a fourth SMS message at said in-field device from said central computer system verifying whether said network device was properly installed based on said installation verification test of said networked device.

19. A non-transitory computer readable storage medium having instructions embodied therein that when executed cause a computer system to perform a method for verifying installation of a networked device, said method comprising:

receiving a short message service (SMS) message at a central computer system after from an in-field device after an installation of a network device wherein said SMS message comprises a command to start a verification process;

sending a second SMS message from said central computer system to said in-field device requesting an installation number;

receiving said installation number from said in-field device at said central computer system in a third SMS message;

authenticating said installation number at said central computer system; contacting a gateway networked to said network device from said central computer system with a command to run an installation verification test of said networked device;

receiving results of said installation verification test at said central computer system from said gateway; and sending a fourth SMS message from said central computer system to said in-field device with said results of said installation verification test.

\* \* \* \* \*